United States Patent
Luce et al.

(10) Patent No.: US 6,378,044 B1
(45) Date of Patent: Apr. 23, 2002

(54) METHOD AND SYSTEM FOR CACHE REPLACEMENT AMONG CONFIGURABLE CACHE SETS

(75) Inventors: Roger W. Luce; James J. Jirgal, both of Chandler, AZ (US)

(73) Assignee: VLSI Technology, Inc., San Jose, CA (US)

(*) Notice: Subject to any disclaimer, the term of this patent is extended or adjusted under 35 U.S.C. 154(b) by 0 days.

(21) Appl. No.: 09/401,046

(22) Filed: Sep. 22, 1999

(51) Int. Cl.⁷ ............................................. G06F 12/00
(52) U.S. Cl. ..................... 711/133; 711/141; 711/159
(58) Field of Search .................................. 711/128, 133, 711/134, 136, 139, 141, 156, 138, 202

(56) References Cited

U.S. PATENT DOCUMENTS

| | | | | |
|---|---|---|---|---|
| 4,802,086 A | * | 1/1989 | Gay et al. | 711/133 |
| 5,537,571 A | * | 7/1996 | Deville | 711/133 |
| 5,553,262 A | | 9/1996 | Ishida et al. | 395/450 |
| 5,729,712 A | | 3/1998 | Whittaker | 395/449 |
| 5,737,749 A | | 4/1998 | Patel et al. | 711/123 |
| 5,737,752 A | * | 4/1998 | Hilditch | 711/133 |
| 5,943,687 A | * | 8/1999 | Liedberg | 711/156 |
| 6,023,747 A | * | 2/2000 | Dodson | 711/141 |
| 6,049,849 A | * | 4/2000 | Arimilli et al. | 711/133 |
| 6,065,099 A | * | 5/2000 | Clark et al. | 711/133 |
| 6,073,224 A | * | 6/2000 | Watkins | 711/202 |
| 6,128,703 A | * | 10/2000 | Bourekas et al. | 711/138 |
| 6,141,731 A | * | 10/2000 | Beardsley et al. | 711/136 |
| 6,145,057 A | * | 11/2000 | Arimilli et al. | 711/133 |
| 6,154,813 A | * | 11/2000 | Martin et al. | 711/133 |

FOREIGN PATENT DOCUMENTS

| | | | | |
|---|---|---|---|---|
| EP | 0 325422 A2 | 7/1989 | | G06F/12/08 |
| GB | 2311880 A | 10/1997 | | G06F/12/08 |

* cited by examiner

*Primary Examiner*—Matthew M. Kim
*Assistant Examiner*—Fred F. Tzeng
(74) *Attorney, Agent, or Firm*—Wagner, Murabito & Hao LLP

(57) ABSTRACT

A method and system for cache replacement among configurable cache sets. In one embodiment, the present invention identifies a cache location corresponding to uncached data received from main memory and determines a data type for the uncached data. The present invention then examines the cache location in at least one of the configurable cache sets which is configured for the data type of the uncached data. Provided that the cache location of at least one of the configurable cache sets is not occupied by valid data and that the same configurable cache set is configured for the data type of the uncached data, the present invention stores the uncached data into that configurable cache set at the cache location without displacing valid data therein. Provided that the cache location of each of the configurable cache sets which is configured for the data type of the uncached data is occupied by valid yet old data, the present invention replaces the old data stored in one of the configurable cache sets at the cache location with the uncached data. This embodiment of the present invention thus provides a method for cache replacement among configurable cache sets.

10 Claims, 5 Drawing Sheets

METHOD AND SYSTEM FOR CACHE REPLACEMENT AMONG CONFIGURABLE CACHE SETS

TECHNICAL FIELD

The present claimed invention relates to the field of cache architecture. More specifically, the present claimed invention relates to replacement of cache contents in a set associative cache environment.

BACKGROUND ART

Modern computer systems typically have a main memory (e.g., random access memory, or RAM) for storing data (e.g., program instructions and operands) therein to facilitate program execution. In addition, cache memory is usually also included in modern computer systems. Cache memory is high speed memory for storing data which is frequently accessed, and data can be stored therein and retrieved therefrom very efficiently. Main memory is thus configured to store frequently used data into cache memory in order to optimize the performance of computer systems. However, main memory is generally much larger than cache memory in a computer system. Therefore, the computer system needs to have a mechanism for determining what data within cache memory is to be replaced when new, uncached data is read from main memory for caching and there is no more space available in cache memory.

Generally, within a set associative cache environment, the cache memory is divided into multiple sets (e.g., 4 sets, or four-way), where each set acts as an independent cache for the entire address space of main memory. Data in a given location in main memory (e.g., a particular 4-byte word in main memory) can be stored in one, and only one, corresponding location in each one of the cache sets. Since main memory is larger than any of the individual cache sets, several locations in main memory would map to a particular location in each of the cache sets. Thus, when that specific location in each cache set is already occupied by valid data, and new, uncached data from a location in main memory which also maps to the same specific location needs to be cached, a decision must be made as to which cache set's old yet valid data is to be cast out and replaced by the new, uncached data just read from main memory.

Some prior art approaches to cache replacement are geared towards cache environments which include multiple cache sets. However, these prior art cache replacement approaches do not take into consideration the fact that the individual cache sets in a set associative cache environment can be configured to cache instructions (code), operands (data), or both. Thus, such prior art approaches cannot be applied to select which among the multiple cache sets is to be used for storing the newly read uncached data based on the type of data read. In other words, such prior art approaches fail to provide a cache replacement mechanism which accounts for the existence of code-only, data-only, and code-data cache sets in any given configuration within a set associative cache environment. Thus, a method and system for cache replacement in a set associative cache environment having configurable cache sets is needed.

Additionally, a method and system for cache replacement suitable for use in a set associative cache environment must not require complete revamping of existing computer systems. That is, in implementing a viable method and system for cache replacement in a set associative cache environment, components that are well known in the art and are compatible with existing computer systems need to be used so that the cost of realizing the method and system for cache replacement is low. In so doing, the need to incur costly expenditures for retrofitting existing computer systems or for building custom components is eliminated.

Thus, a need exists for a method and system for cache replacement. A further need exists for a method and system which meets the above listed need wherein the method and system operates in a set associative cache environment having configurable cache sets. Still another need exists for a method and system which meets both of the above cited needs and wherein the method and system is conducive to use with existing computer systems.

DISCLOSURE OF THE INVENTION

The present invention provides a method and system for cache replacement, and which operates in a set associative cache environment having configurable cache sets. The present invention accomplishes the above achievements with a method and system which performs cache replacement in a pseudo-random manner and which is conducive to use with existing computer systems.

Specifically, in one embodiment, the present invention identifies a cache location corresponding to uncached data received from main memory and determines a data type for the uncached data. The present invention then examines the cache location in at least one of the configurable cache sets which is configured for the data type of the uncached data. Provided that the cache location of at least one of the configurable cache sets is not occupied by valid data and that the same configurable cache set is configured for the data type of the uncached data, the present invention stores the uncached data into that configurable cache set at the cache location without displacing valid data therein. Provided that the cache location of each of the configurable cache sets which is configured for the data type of the uncached data is occupied by valid yet old data, the present invention replaces the old data stored in one of the configurable cache sets at the cache location with the uncached data. In so doing, this embodiment of the present invention provides a method for cache replacement among configurable cache sets.

In another embodiment, the present invention includes the above recited steps and further the present invention examines a counter for the data type of the uncached data, the counter being incremented based on configurations of the first and second configurable cache sets, such that a value of the counter does not exceed a number of the first and second configurable cache sets which is configured for the data type of the uncached data. The present invention then replaces the old data stored in one of the first and second configurable cache sets at the cache location with the uncached data, where the particular configurable cache set for storing the uncached data is selected based on the value of the counter.

The present invention also describes in detail the system for performing the steps of the above described method.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
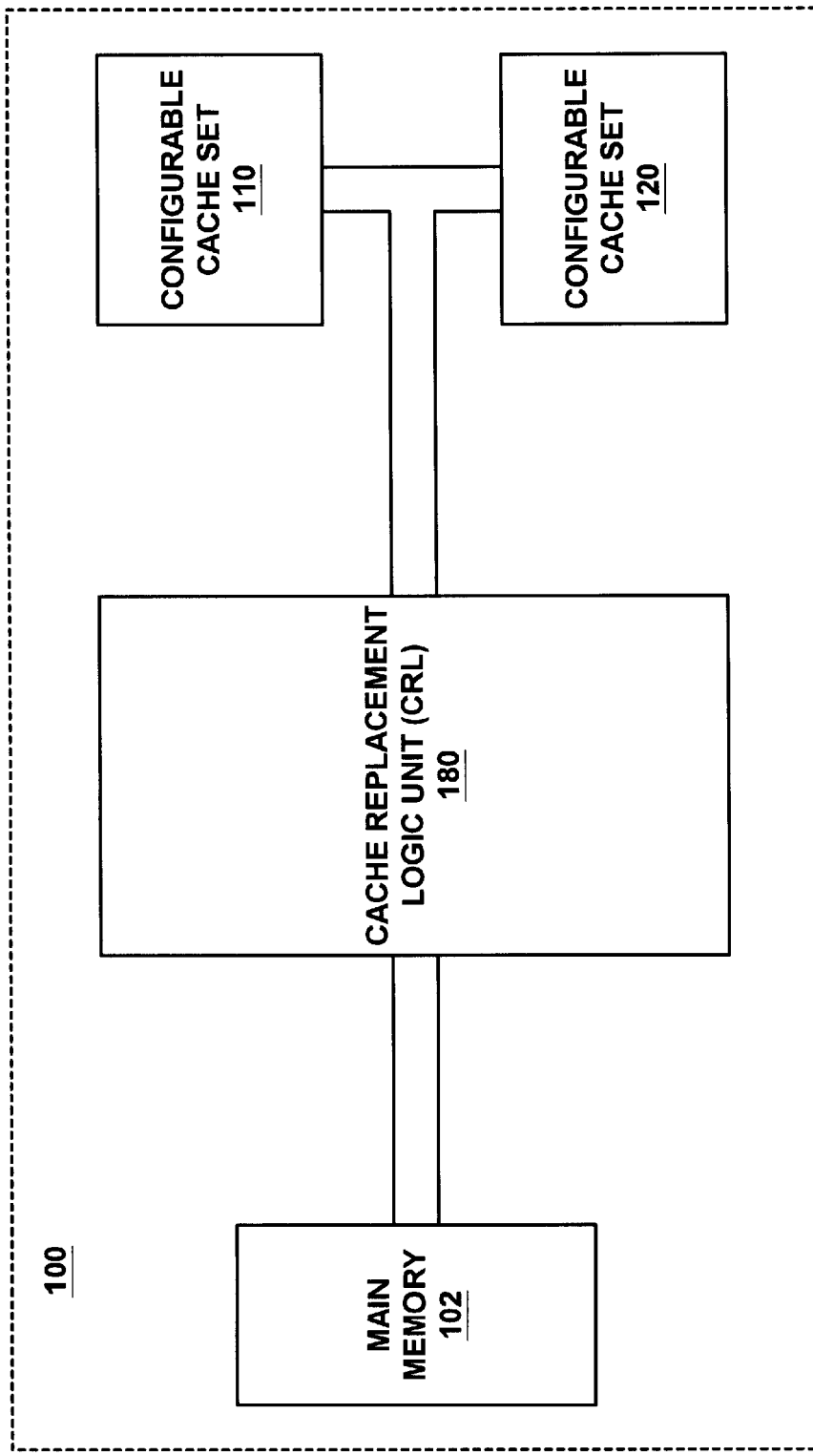
FIG. 1A is a schematic diagram of the cache replacement system in accordance with one embodiment of the present invention.
Figure 1B:
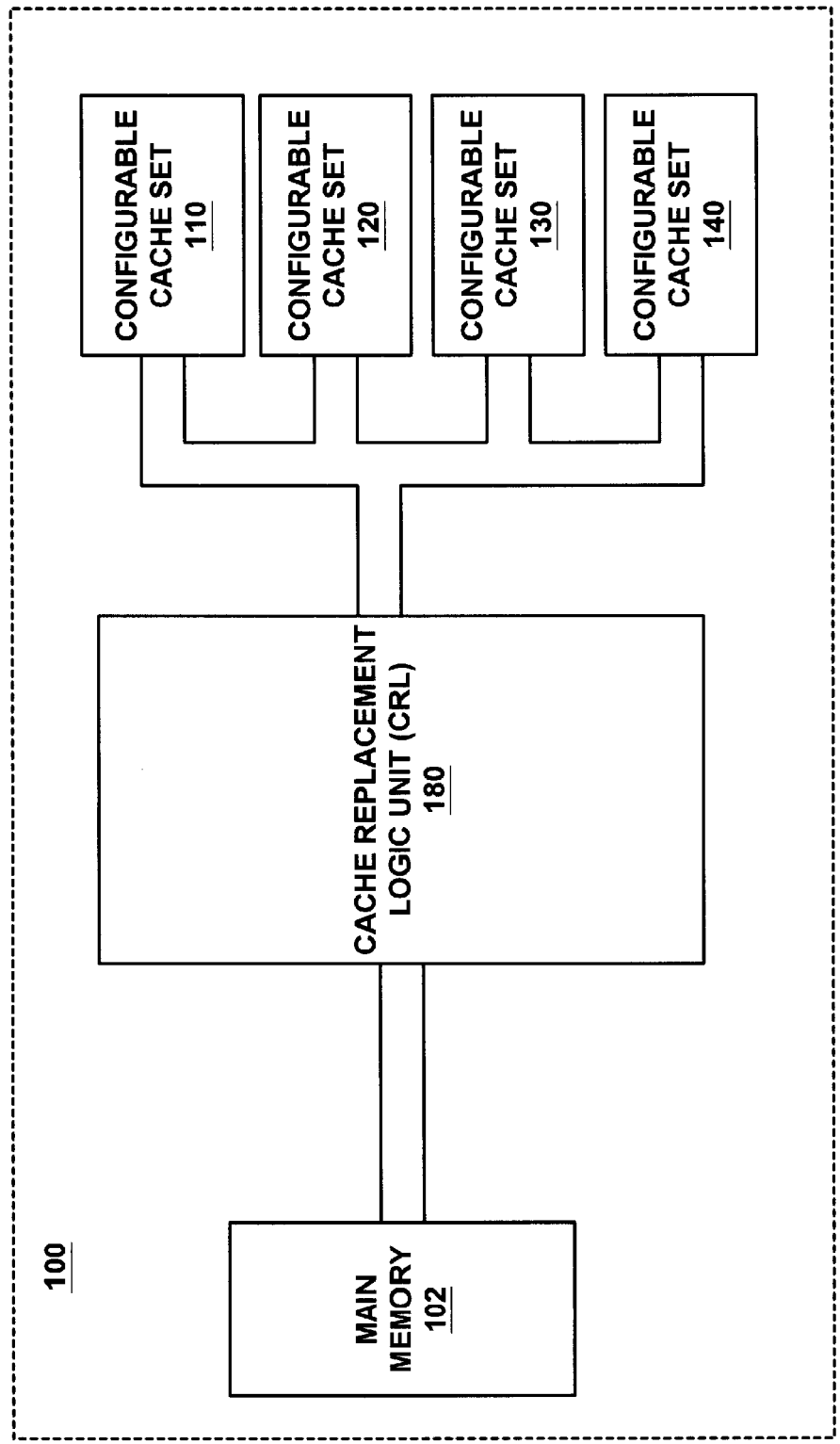
FIG. 1B is a schematic diagram of the cache replacement system in accordance with another embodiment of the present invention.
Figure 2:
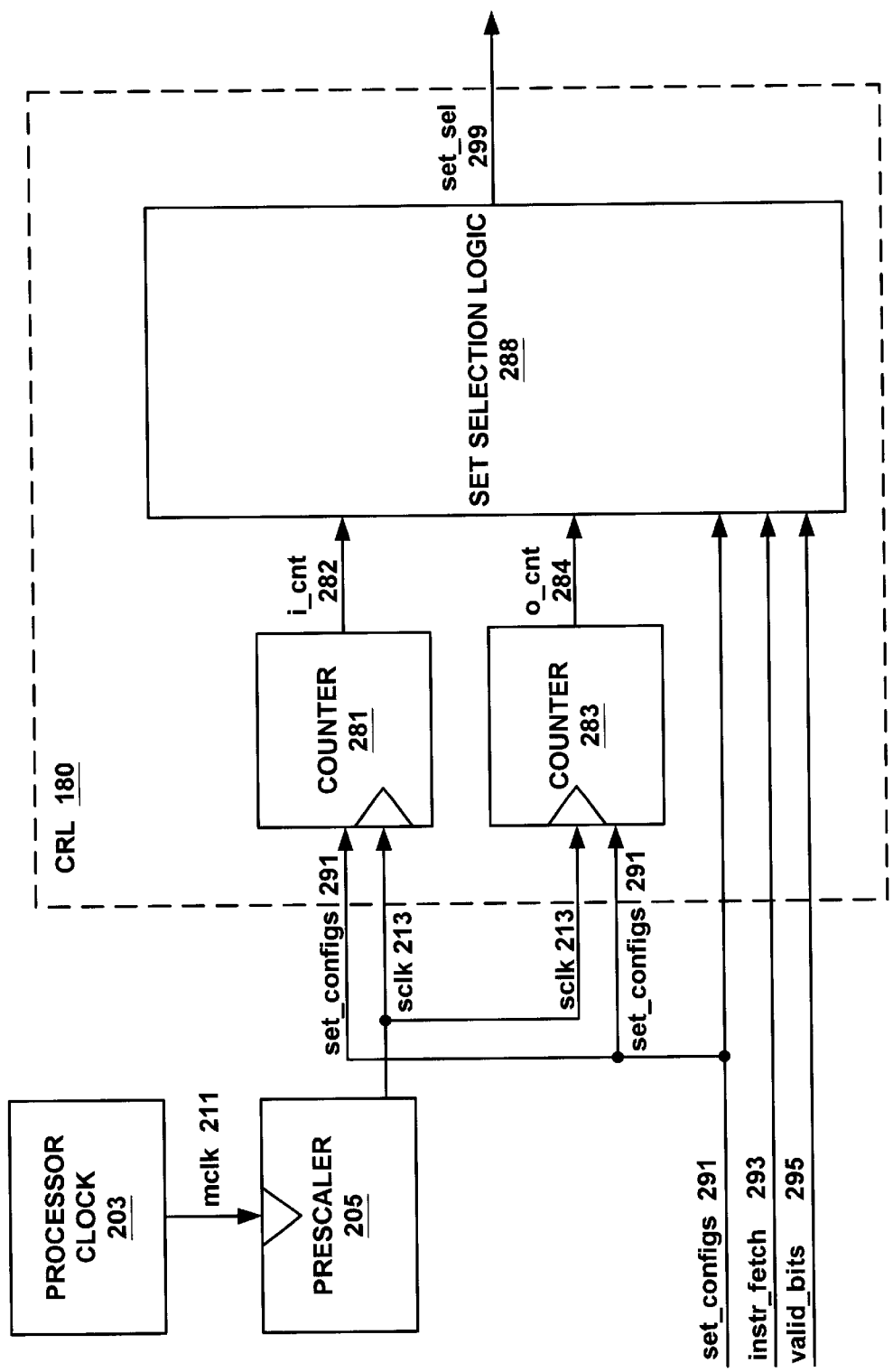
FIG. 2 is a schematic diagram of an exemplary embodiment of the cache replacement logic unit (CRL) of the present invention.

The following description of the present invention will begin with a detailed description of the physical structure and architecture of the present invention with reference to FIGS. 1A, 1B and 2. This description will then be followed by a detailed description setting forth the operation of the present invention with reference to FIGS. 3 and 4.

Architecture of the Cache Replacement System of the Present Invention

With reference now to FIG. 1A, a schematic diagram of the cache replacement system in accordance with one embodiment of the present invention is shown. Regarding the structure and architecture of the present invention, cache replacement system 100 comprises main memory 102 which is adapted to store data therein and to send data therefrom. Cache replacement system 100 further comprises configurable cache set 110, which is coupled to main memory 102, and configurable cache set 120, which is also coupled to main memory 102. Moreover, cache replacement system 100 further includes cache replacement logic unit (CRL) 180, which is coupled between main memory 102 and each of configurable cache sets 110 and 120.

With reference next to FIG. 1B, a schematic diagram of the cache replacement system in accordance with another embodiment of the present invention is shown. In this embodiment, cache replacement system 100 comprises main memory 102 which is adapted to store data therein and to send data therefrom. Cache replacement system 100 further comprises configurable cache sets 110, 120, 130 and 140. Each of configurable cache sets 110, 120, 130 and 140 is coupled to main memory 102. Moreover, cache replacement system 100 further includes CRL 180, which is coupled between main memory 102 and each of configurable cache sets 110, 120, 130 and 140.

As mentioned above, within a set associative cache environment, the cache memory is divided into multiple sets, where each set acts as an independent cache for the entire address space of main memory 102. An exemplary four-way set associative cache environment is thus illustrated in FIG. 1B, where the four configurable cache sets are shown as configurable cache sets 110, 120, 130 and 140. Data in a given location in main memory 102 can be stored in one, and only one, corresponding location in each one of configurable cache sets 110, 120, 130 and 140. An exemplary address size for main memory 102 is 32 bits, with a corresponding total address space of four gigabytes (4 GB). A typical total cache size in this exemplary four-way set associative cache environment is eight kilobytes (8 kB), so each of configurable cache sets 110, 120, 130 and 140 is 2 kB in size. Moreover, an exemplary word size is 32 bits (4 bytes), such that each of configurable cache sets 110, 120, 130 and 140 can store up to 512 words. Since main memory 102 is larger than any of configurable cache sets 110, 120, 130 and 140, several locations in main memory 102 would map to a particular location in each of configurable cache sets 110, 120, 130 and 140. In other words, every cache location in each of configurable cache sets 110, 120, 130 and 140 corresponds to multiple locations in main memory 102.

Referring next to FIG. 2, a schematic diagram of an exemplary embodiment of the cache replacement logic unit (CRL) of the present invention is shown. In the instant embodiment, CRL 180 comprises counter 281, counter 283 and set selection logic (SSL) 288. Counter 281 is coupled to SSL 288 via i_cnt line 282, while counter 283 is coupled to SSL 288 via o_cnt line 284. SSL 288 receives i_cnt and o_cnt signals from counters 281 and 283 over i_cnt line 282 and o_cnt line 284, respectively. Further, SSL 288 is coupled to receive additional signals over set_configs line 291, instr_fetch line 293 and valid_bits line 295. SSL 288 is also coupled to set_sel line 299 for transmitting set_sel signals. The signals received by and transmitted from SSL 288 are described in detail further below with reference to FIGS. 3 and 4.

Referring still to FIG. 2, processor clock 203 is coupled to prescaler 205 via mclk line 211. Prescaler 205 is in turn coupled to both of counters 281 and 283 via sclk line 213. Counters 281 and 283 are also coupled to receive an input over set_configs line 291. Again, the inputs and outputs of counters 281 and 283 are described in detail further below.

Operation of the Cache Replacement System of the Present Invention

Figure 3:
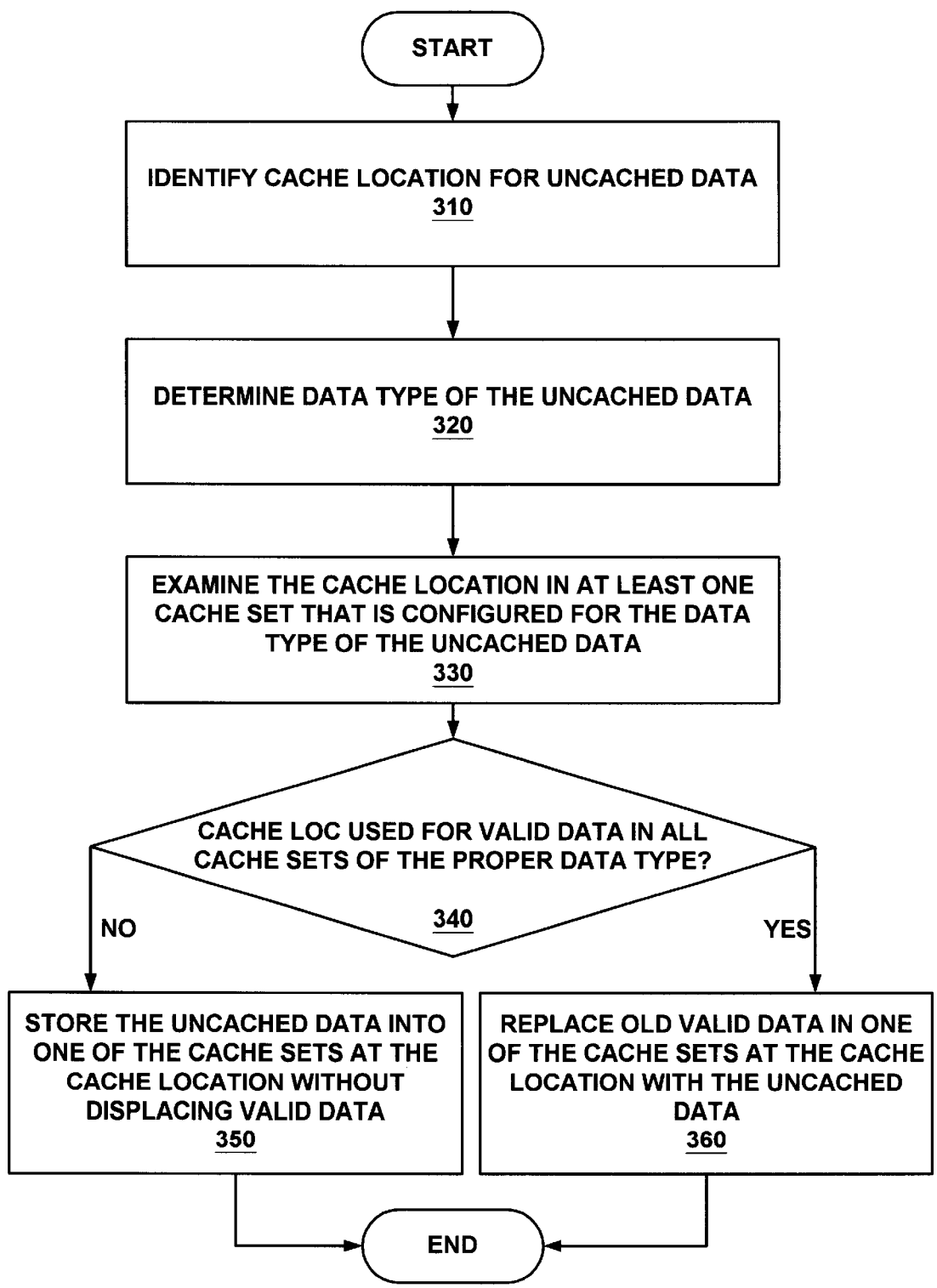
FIG. 3 is a flow chart of steps for performing cache replacement in a set associative cache environment in accordance with one embodiment of the present invention.

The following is a detailed description of the operation of the present invention. With reference now to FIG. 3, a flow chart of steps for performing cache replacement in a set associative cache environment in accordance with one embodiment of the present invention is shown. The steps of FIG. 3 will be described in conjunction with the embodiment of FIGS. 1A, 1B, and 2. As shown in step 310, CRL 180 identifies a cache location corresponding to uncached data received at CRL 180 from main memory 102.

Referring still to step 310 and FIGS. 1A, 1B, and 2, as discussed above, data in a given location in main memory 102 can be stored in one, and only one, corresponding location in each one of configurable cache sets 110, 120, 130 and 140, and several locations in main memory 102 would map to a particular location in each of configurable cache sets 110, 120, 130 and 140. When that specific location in each of configurable cache sets 110, 120, 130 and 140 is already occupied by valid data, and uncached data from a location in main memory 102 which also maps to the same specific location needs to be cached, a decision must be made as to which of configurable cache sets' 110, 120, 130 and 140 old yet valid data is to be cast out and replaced by the uncached data just read from main memory 102. Hence, CRL 180 has to identify the specific cache location at which the uncached data received from main memory 102 is to be stored.

Referring still to FIG. 3, in step 320, CRL 180 determines a data type for the uncached data sent from main memory 102.

It is appreciated that within the scope of the present invention, configurable cache sets 110, 120, 130 and 140 can be independently configured for various modes based on the type of data that can be stored in a particular cache set. Exemplary modes include instruction-only mode, operand-only mode, unified mode and direct-access mode. A cache set configured for instruction-only mode only caches program instructions and not program operands. Likewise, a cache set configured for operand-only mode only caches program operands and not program instructions. On the other hand, a cache set configured for unified mode caches both program instructions and program operands. In direct-access mode, a cache set is used as a high speed, local scratch pad memory in a specific address range within the address space of main memory 102. Therefore, the data type of the uncached data has to be determined before the candidate(s) for storing the uncached data can be identified (from among configurable cache sets 110, 120, 130 and 140) based on the particular configuration of each of configurable cache sets 110, 120, 130 and 140.

Furthermore, in order to determine which among configurable cache sets 110, 120, 130 and 140 are viable candidates for storing the uncached data, the actual configurations of configurable cache sets 110, 120, 130 and 140 (e.g., the mode of each of configurable cache sets 110, 120, 130 and 140) must be known. For example, a cache set in operand-only mode does not store program instructions and thus is not a viable candidate for uncached data which contains a program instruction. As another example, a cache set in unified mode accepts either program instructions or program operands, so that the cache set is a viable candidate for storing uncached data irrespective of data type.

Referring still to FIG. 3, in step 330, CRL 180 examines the cache location identified in at least one of configurable cache sets 110, 120, 130 and 140 which is configured for the particular data type of the uncached data.

In the present embodiment, a set_configs signal is sent to SSL 288 over set_configs line 291. The set_configs signal contains information about the actual configurations of configurable cache sets 110, 120, 130 and 140. SSL 288 also receives an instr_fetch signal over instr_fetch line 293. The instr_fetch signal is a boolean flag that indicates the data type of the uncached data being sent from main memory 102. The set_configs signal and the instr_fetch signal are described in further detail below. Using the set_configs signal and the instr_fetch signal, SSL 288 of CRL 180 determines which of configurable cache sets 110, 120, 130 and 140 are viable candidates for storing the uncached data in question. In a preferred embodiment, at least one of such viable candidates is examined to determine its availability to store the uncached data.

With reference still to FIG. 3, in step 340, CRL 180 determines whether the particular cache location identified in step 310 is occupied by valid data in all of the viable candidates among configurable cache sets 110, 120, 130 and 140 as determined in step 330.

In the instant embodiment, a valid_bits signal is sent to SSL 288 over valid_bits line 295. The valid_bits signal contains information about the validity of the data currently stored at the particular cache location in each of the viable candidate cache sets. Using the valid_bits signal, SSL 288 of CRL 180 determines which, if any, of the viable candidate cache sets are actually available for storing the uncached data without having to displace valid data.

With reference still to FIG. 3, if a configurable cache set (among configurable cache sets 110, 120, 130 and 140) which does not contain valid data at the particular cache location and which is configured for the data type of the uncached data has been successfully identified in step 340, then the present embodiment proceeds to step 350 wherein the uncached data is stored into the configurable cache set thus identified at the cache location. Since the configurable cache set selected for storing the uncached data does not contain valid data at the particular cache location, the caching of the uncached data is thus achieved without displacing any valid data.

Referring still to FIG. 3, if it is determined in step 340 that all of the configurable cache sets that are viable candidates for storing the uncached data are already occupied by valid data at the particular cache location, then process 300 proceeds to step 360 wherein one of the viable candidate cache sets is selected and the old data stored therein at the particular cache location is replaced with the uncached data. A more detailed description of step 360 in accordance with one embodiment of the present invention is provided with reference to FIG. 4 below.

Figure 4:
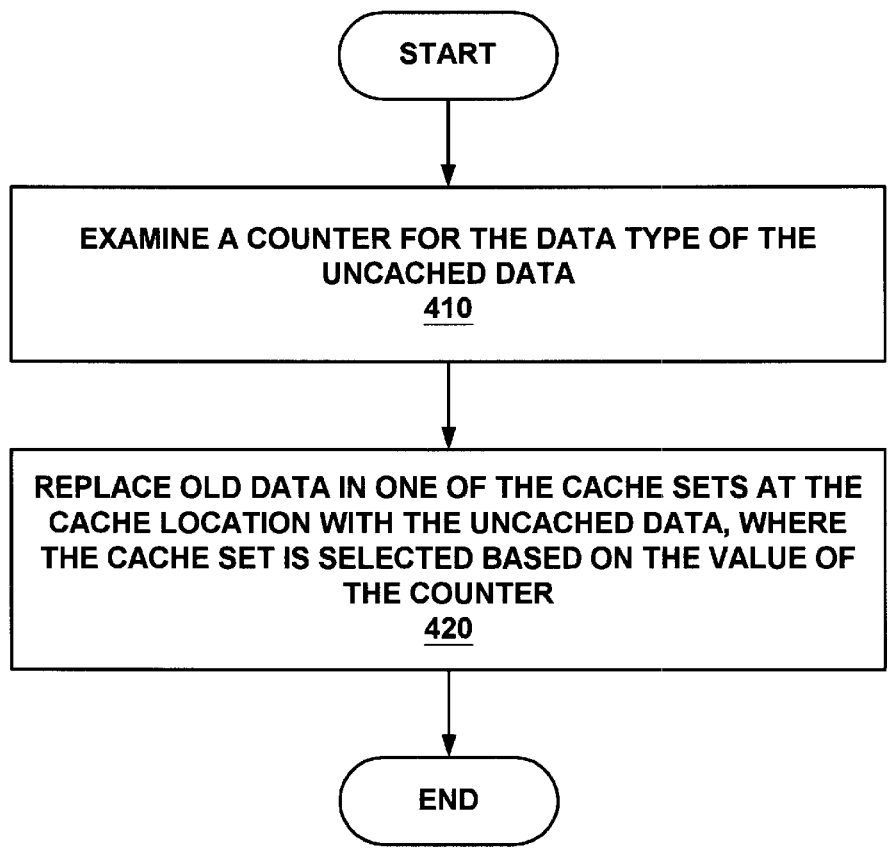
FIG. 4 is a flow chart of steps for determining which cache set's content is to be replaced in accordance with one embodiment of the present invention.

Referring next to FIG. 4, a flow chart of steps for determining which cache set's content is to be replaced in accordance with one embodiment of the present invention is shown. More particularly, step 350 of process 300 (FIG. 3) is described in greater detail in accordance with one embodiment of the present invention. In step 410, a counter for the data type of the uncached data is examined. In an exemplary embodiment wherein the data types include program instruction and program operand, CRL 180 comprises two counters, namely: counter 281 for the program instruction data type and counter 283 for the program operand data type.

In step 420, one of the viable candidate cache sets is selected based on the value of the counter as determined in step 410, and the old data stored in the selected cache set at the particular cache location is replaced with the uncached data.

In one embodiment, counters 281 and 283 are two-bit counters. Two-bit counters are chosen because there are four sets of configurable cache sets 110, 120, 130 and 140. Importantly, counters 281 and 283 are incremented in a manner based on the configurations of configurable cache sets 110, 120, 130 and 140 and on system conditions such as the cache line fill rate.

Referring back to FIG. 2, counters 281 and 283 each receives the sclk signal over sclk line 213 from prescaler 205, which in turn receives the mclk signal over mclk line 211 from processor clock 203. In a typical embodiment, processor clock 203 drives the central processing unit (CPU) of the computer system with the mclk signal. Thus, the mclk signal represents the processor clock cycle or clocking rate of the computer system. In the present invention, prescaler 205 receives the mclk signal and generates the sclk signal by scaling the mclk signal. In one embodiment, the mclk signal is divided by a factor of eight to generate the sclk signal. In other words, in this embodiment, prescaler 205 is a divideby-eight counter which is commonly used in the art and whose value increments from zero to seven. The divisor value of eight is chosen for prescaler 205 because in this embodiment, a cache line fill is completed in just under eight CPU clock cycles. It is understood that the divisor value for prescaler 205 can easily be modified for different system conditions within the scope and spirit of the present invention.

With reference still to FIG. 2, counters 281 and 283 also receive the set_configs signal over set_configs line 291. The set_configs signal indicates which mode each of configurable cache sets 110, 120, 130 and 140 is configured for. Significantly, the set_configs signal allows counters 281 and 283 to each set a maximum counter value for the corresponding data type. More specifically, in one embodiment, the maximum value for counter 281, which is designated for the program instruction data type, is set to be the number of cache sets among configurable cache sets 110, 120, 130 and 140 that are configured for either instruction-only mode or unified mode. Likewise, in this embodiment, the maximum value for counter 283, which is designated for the program operand data type, is set to be the number of cache sets among configurable cache sets 110, 120, 130 and 140 that are configured for either operand-only mode or unified mode.

Thus, as an example, if all four of configurable cache sets 110, 120, 130 and 140 are configured for unified mode, then divide-by-four counters are chosen for both counters 281 and 283. As such, in this embodiment, each of counters 281 and 283 starts at a value of zero and the value increments by one in sequential fashion whenever prescaler 205 reaches its maximum value of seven. Thus, in this example, the two counters 281 and 283 increment in lock step (e.g., 0, 1, 2, 3, 0, 1, 2, 3, 0, 1, ... ). As another example, if configurable cache set 110 (designated as set 0) is configured for instruction-only mode and configurable cache sets 120, 130 and 140 (designated as set 1, set 2 and set 3, respectively) are configured for operand-only mode, then counter 281 remains at its reset value of zero and does not increment at all, while counter 283 starts with an initial value of one and increments up to three before it resets to one and starts over (e.g., 1, 2, 3, 1, 2, 3, 1, ... ), with each increment occurring whenever the value of prescaler 205 reaches seven. By so doing, the present invention allows the cache set selection to be made in a pseudo-random manner.

Referring yet again to FIG. 2, in the present embodiment, the outputs of counters 281 and 283, namely, the i_cnt signal and the o_cnt signal, are transmitted to SSL 288 over i_cnt line 282 and o_cnt line 284, respectively. Moreover, the set_configs signal is transmitted over set_configs line 291 to SSL 288. In one embodiment, the set_configs signal is eight-bit wide, with two bits encoding the configuration for each of the four configurable cache sets 110, 120, 130 and 140. Thus, the set_configs signal encodes the current configuration of every one of configurable cache sets 110, 120, 130 and 140. In addition, the instr_fetch signal is transmitted to SSL 288 over instr_fetch line 293. The instr_fetch signal is a boolean flag that indicates the data type of the uncached data being sent from main memory 102. In particular, in one embodiment, if the flag is 'True', the uncached data contains a program instruction, whereas if the flag is 'False', the uncached data contains a program operand. Furthermore, the valid_bits signal is transmitted to SSL 288 over valid_bits line 295. In one embodiment, the valid_bits signal comprises one bit for each of the four configurable cache sets 110, 120, 130 and 140, where each bit indicates the validity of the existing data in each of configurable cache sets 110, 120, 130 and 140 at the particular cache location where the uncached data maps to. With the five signals described above as inputs, SSL 288 of CRL 180 determines which among configurable cache sets 110, 120, 130 and 140 is to be selected for storing the uncached data from main memory 102. The selection is encoded in the set_sel signal, which is transmitted over set_sel line 299 and used to direct the uncached data to the selected cache set to be stored.

It is appreciated that while the present invention is illustrated above with reference to a four-way set associative cache environment, the present invention is easily adapted for use in any n-way set associative cache environment. It is also appreciated that the present invention can be used in primary cache memory, secondary cache memory, or other kinds of memory which require that replacement or cast-out decisions be made under prescribed circumstances. Additionally, it is understood that the present invention is well suited for use with any processor architecture that distinguishes between instruction and operand fetches. Examples of processors with such architecture include the ARM 740 processor and Intel x86 processors. Furthermore, although a specific architecture is shown in the embodiment of FIG. 2, the present invention is also well suited to using various alternatives, modifications, and equivalents, which are included within the spirit and scope of the present claimed invention.

Thus, by furnishing a mechanism that facilitates the pseudo-random selection of multiple configurable cache sets, the present invention provides a system and method for cache replacement in a set associative cache environment having configurable cache sets. It is noted once again that prior art cache replacement approaches are inapplicable in a set associative cache environment having configurable cache sets because those approaches do not take into consideration the presence of multiple configurable cache sets in the cache environment.

Furthermore, by employing inexpensive and commonly available components such as counters, the present invention provides a cache replacement method and system for use in a set associative cache environment that can be implemented in a very cost-efficient manner. Moreover, by using components that are commonly used in the art, the present invention does not require expensive retrofitting of existing computer systems. Thus, the present invention is highly conducive for use with existing computer systems.

Thus, the present invention provides a method and system for cache replacement, and one which is well-suited for use in a set associative cache environment having configurable cache sets. The present invention accomplishes the above achievements with a method and system which performs cache replacement in a pseudo-random manner and which is conducive to use with existing computer systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cache replacement system comprising:

a main memory adapted to send uncached data therefrom;

a first configurable cache set coupled to said main memory;

a second configurable cache set coupled to said main memory; and a cache replacement logic unit (CRL) coupled between said main memory and both of said first and second configurable cache sets; said CRL adapted to identify a cache location corresponding to said uncached data; said CRL also adapted to determine a data type for said uncached data; said CRL further adapted to examine said cache location in at least one of said first and second configurable cache sets which is configured for said data type of said uncached data; said CRL further adapted to store said uncached data into one of said first and second configurable cache sets at said cache location without displacing valid data in said one of said first and second configurable cache sets, provided that said cache location of said one of said first and second configurable cache sets is not occupied by valid data and that said one of said first and second configurable cache sets is configured for said data type of said uncached data; and said CRL further adapted to replace old data stored in one of said first and second configurable cache sets at said cache location with said uncached data, provided that said old data is valid and that said cache location at which said uncached data is to be stored resides in one of said first and second configurable cache sets which is configured for said data type of said uncached data; a counter coupled to said CRL and adapted to be incremented based on configurations of said first and second configurable cache sets, such that a value of said counter does not exceed a number of said first and second configurable cache sets which is configured for said data type of said uncached data, wherein said CRL is further adapted to examine said value of said counter; said CRL is also adapted to replace said old data stored in said one of said first and second configurable cache sets at said cache location with said uncached data, said one of said first and second configurable cache sets being selected based on said value of said counter.

2. The cache replacement system as recited in claim 1 wherein said counter is further adapted to be incremented based on a processor clock.

3. The cache replacement system as recited in claim 1 wherein said counter is further adapted to be incremented based on a cache line fill rate expressed as a ratio of processor clock cycles.

4. The cache replacement system as recited in claim 1 wherein said uncached data received from said main memory has a corresponding predetermined cache location in selected said first and second configurable cache sets.

5. The cache replacement system as recited in claim 1 wherein said first and second configurable cache sets are independently configurable for a plurality of modes, said plurality of modes comprising an instruction-only mode and an operand-only mode.

6. The cache replacement system as recited in claim 5 wherein said plurality of modes further comprises a unified mode.

7. The cache replacement system as recited in claim 5 wherein said plurality of modes further comprises a direct-access mode.

8. The cache replacement system as recited in claim 1 wherein said first and second configurable cache sets are set associative.

9. The cache replacement system as recited in claim 1 wherein each of said first and second configurable cache sets has a size of two kilobytes (2 kB).

10. The cache replacement system as recited in claim 1 wherein said main memory has an address size of 32 bits.

* * * * *